US008136563B2

(12) United States Patent
Weber

(10) Patent No.: US 8,136,563 B2
(45) Date of Patent: Mar. 20, 2012

(54) FILM TRANSFER APPARATUS, CASSETTE FOR A FILM TRANSFER APPARATUS AND METHOD FOR OPERATING A FILM TRANSFER APPARATUS

(75) Inventor: Alexander Weber, Weinheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 202 days.

(21) Appl. No.: 12/472,409

(22) Filed: May 27, 2009

(65) Prior Publication Data

US 2009/0294039 A1 Dec. 3, 2009

(30) Foreign Application Priority Data

May 27, 2008 (DE) ......................... 10 2008 025 282

(51) Int. Cl.

| | |
|---|---|
| ***B29C 65/56*** | (2006.01) |
| ***B32B 37/10*** | (2006.01) |
| ***B32B 37/26*** | (2006.01) |
| ***B32B 38/14*** | (2006.01) |
| ***B32B 41/00*** | (2006.01) |
| *B32B 37/06* | (2006.01) |
| *B32B 37/30* | (2006.01) |

(52) U.S. Cl. ......... 156/361; 156/541; 156/543; 156/582

(58) Field of Classification Search .................. 156/361, 156/541, 543, 582

See application file for complete search history.

(56) References Cited

U.S. PATENT DOCUMENTS

| | | | | |
|---|---|---|---|---|
| 5,162,069 | A * | 11/1992 | Morris | 156/363 |
| 5,507,908 | A * | 4/1996 | Fukushima et al. | 156/363 |
| 6,153,042 | A * | 11/2000 | Tominaga | 156/709 |
| 6,334,248 | B1 | 1/2002 | Gallagher | |
| 6,378,750 | B1 | 4/2002 | Disano et al. | |
| 6,491,780 | B2 | 12/2002 | Gallagher | |
| 6,814,830 | B2 * | 11/2004 | Yokozawa et al. | 156/230 |
| 2007/0095483 | A1 * | 5/2007 | Krispin et al. | 156/540 |
| 2007/0215288 | A1 | 9/2007 | Weber et al. | |
| 2007/0227651 | A1 * | 10/2007 | Weber | 156/238 |
| 2008/0196662 | A1 | 8/2008 | Reschke et al. | |

FOREIGN PATENT DOCUMENTS

DE 20 2004 003 746 U1 6/2004

(Continued)

OTHER PUBLICATIONS

German Patent and Trademark Office Search Report, dated Dec. 8, 2008, DE102009020103A1.

*Primary Examiner* — Sonya Mazumdar

(74) *Attorney, Agent, or Firm* — Laurence A. Greenberg; Werner H. Stemer; Ralph E. Locher

(57) ABSTRACT

A film transfer unit is provided on an inking unit of a printing unit. If such a film transfer unit includes an intermittent drive device having dancers then, as a result, access to an ink fountain or an inking unit is generally rather restricted. Adjustable guide elements of the intermittent drive device are provided in a frame of an intermittent drive module which can be pushed, in the form of a cassette, out of an opening of the film transfer unit when the film transfer unit is not to be used to transfer a transfer layer from a transfer film to a printing material, so that an installation space which has thus become free can be used to operate an ink fountain of the inking unit. A cassette for a film transfer apparatus and a method for operating a film transfer apparatus, are also provided.

18 Claims, 5 Drawing Sheets

FOREIGN PATENT DOCUMENTS

| | | | |
|---|---|---|---|
| DE | 10 2006 004 094 | A1 | 8/2006 |
| DE | 10 2006 009 633 | A1 | 9/2007 |
| DE | 10 2007 060 028 | A1 | 6/2008 |
| EP | 0 987 106 | A1 | 3/2000 |
| EP | 0 932 501 | A1 | 7/2002 |
| EP | 1 769 915 | A2 | 4/2007 |

* cited by examiner

FILM TRANSFER APPARATUS, CASSETTE FOR A FILM TRANSFER APPARATUS AND METHOD FOR OPERATING A FILM TRANSFER APPARATUS

CROSS-REFERENCE TO RELATED APPLICATION

This application claims the priority, under 35 U.S.C. §119, of German Patent Application DE 10 2008 025 282.4, filed May 27, 2008; the prior application is herewith incorporated by reference in its entirety.

BACKGROUND OF THE INVENTION

Field of the Invention

The present invention relates to a method and an apparatus for transferring a transfer layer adhering to a carrier film through the use of a release layer, under the action of pressure, to flat material at least partly coated with an adhesive. More specifically, the invention relates to a film transfer unit including a transfer nip for the transfer, at least in some areas, of a transfer layer from a carrier film (the transfer layer and the carrier film together form a transfer film) to a printing material, a supply roll to provide the transfer film, a take-up roll to receive used transfer film, and adjustable guide elements to adapt the speed of movement of the transfer film, at least from time to time, to the speed of the printing material in the transfer nip. The invention also relates to a cassette for accommodating guide elements for use in a film transfer apparatus.

Generic film transfer apparatuses are used in the finishing of printed products, for example in order to produce gloss effects. The machines can be subdivided into hot embossing film machines and cold film embossing machines. In the latter, the transfer layer is transferred to the flat material, i.e. to a printing material such as a sheet, only under pressure but not additionally under the action of heat. As a rule, in cold film transfer apparatuses, i.e. cold film embossing devices having a printing unit which is placed upstream of the transfer apparatus, adhesive is printed, so that there remains on the sheet a printed image of adhesive which, within a film transfer unit, is able to pull a corresponding transfer layer off the transfer film being used, so that the transfer layer adheres to the sheet in some areas.

The problem with that film transfer technique is that the transfer film has to be moved at the same speed as the printing material during the transfer and that, as a rule, only small areas on the printing material are to be covered with the transfer layer. In particular, a transfer cylinder involved in the transfer nip often has a so-called channel, in which a printing blanket can be fixed. In the region of that channel, no transfer of the transfer layer through the use of pressure can be carried out. Therefore, the control should always be such that the printed material dips into the transfer nip between the transfer cylinder and an impression cylinder when the channel cannot be in the area of the printing material. Other areas, in which transfer film is transported through the transfer nip without being used, are areas in which no transfer layer is to be transferred to the printing material.

In order to use the transfer film better and to reduce consumable materials, provision is made, for example according to European Patent EP 0 932 501 B1, corresponding to U.S. Pat. Nos. 6,491,780 and 6,334,248, to move the transfer film through a pair of dancer rolls, which are moved cyclically at the same cycle rate as the channel of the transfer cylinder, so that the transfer film is braked to a speed of zero, for example, in the area of the channel. For that purpose, the two dancer rolls are coupled to each other in such a way that a transfer film web which is stored by a first, front dancer from a supply roll, that continues to move, is simultaneously released to a take-up roll by a second, rear dancer. In that way, a certain constancy of the web tension in the area of the supply and take-up roll can be ensured. For that purpose, in order to spare the transfer film, both dancers are moved in coupled fashion in a braking direction. In that case, the film can in particular also be pulled back out of the transfer nip.

European Patent Application EP 1 769 915 A2 further discloses accommodating such an intermittent drive device in a film transfer unit which is used within a film transfer apparatus that is based on a conventional printing press. For that purpose, a take-up roll and a supply roll for a transfer film web, together with guide elements, are provided above a conventional printing unit, and the film web is led through a transfer nip over the guide elements. The transfer nip is formed in that case by a blanket cylinder and an impression cylinder. An intermittent drive device is provided in that case in the form of adjustable guide elements above the transfer nip. Those moving guide elements are provided in a fixed manner above the printing unit, that is to say above the inking unit and the ink feed of the printing unit. One advantage of such a provision of a film transfer module above a printing unit is that the printing unit can be used both as a printing unit and as a film transfer unit as required. As a result of the covering of the ink feed by the intermittent drive devices, use of the converted printing unit as a conventional printing unit is at least made more difficult. It may in particular be necessary to remove the complete film module, which includes the intermittent drive devices, the guides, the take-up and supply rolls, entirely in order to use the printing unit just as a printing unit.

SUMMARY OF THE INVENTION

It is accordingly an object of the invention to provide a film transfer apparatus, a cassette for a film transfer apparatus and a method for operating a film transfer apparatus, which overcome the hereinafore-mentioned disadvantages of the heretofore-known devices and methods of this general type which, even when used on a conventional printing unit, at least no longer stand in the way of use of the printing unit as a conventional printing unit and which, during such use, minimize effort as far as possible.

With the foregoing and other objects in view there is provided, in accordance with the invention, a film transfer apparatus for a transfer film having a carrier film and a transfer layer. The film transfer apparatus comprises a transfer nip for transferring the transfer layer, at least in some areas, from the carrier film to a printing material, a film transfer unit having an opening, a supply roll for providing the transfer film and a take-up roll for receiving used transfer film, a frame, adjustable guide elements disposed in the frame for adapting a speed of movement of the transfer film, at least from time to time, to a speed of the printing material in the transfer nip, and holding elements disposed in vicinity of the opening for holding the frame. The frame with the guide elements is constructed as a cassette configured to be introduced into the opening. For this purpose, the guide elements can be provided before and/or after the transfer nip of the film transfer unit.

If the film transfer module is provided on a conventional printing unit and if the film transfer module substantially includes guide elements and a supply roll and a take-up roll and if, furthermore, an intermittent drive device is provided, then as a result of the provision of this intermittent drive device within a frame of a cassette, the entire intermittent drive device can advantageously be taken out of the film transfer unit, which means that the space above the printing unit itself becomes free. Through the use of this space, it is then advantageously possible to make access directly to the ink feed of the inking unit, in particular to the ink fountain. A use of the printing unit with the elements of the film transfer unit put in place is then no longer substantially hindered.

The adjustable guide elements need a drive. In a first alternative, the latter should advantageously be provided within the frame of the cassette. In a second alternative, provision is made for the drive or the drives of the movable guide elements to be provided outside the frame. In order to mount and to insert the cassette into the film transfer unit and to remove the cassette from the film transfer unit, it should be possible for these drives advantageously to be connected by couplings to the guide elements and to the frame and also detached from the latter again. In order to insert and remove the cassette, the drives can then be configured in such a way that they can be removed.

In a further development of this alternative, provision can be made for the drives themselves to be provided in a fixed manner in the frame of the film transfer unit and then to be connectable through coupling elements to a frame of the cassette that is introduced.

In order to pull the transfer film off a supply roll when using an intermittent drive, an upstream feed device for driving the transfer film is provided. If this feed device is not used during the operation without intermittent drive, this can also be provided within the frame of the cassette.

In this case, too, the feed drive of the feed device can be configured to be within the frame and transportable with the latter or, in an alternative, to be provided outside the frame and capable of being connected to the latter or to the feed as such through couplings. The feed drive itself can then also be provided in a fixed manner in the film transfer unit itself and capable of being detachably connected to the frame of the cassette through the couplings.

As a result of the provision of the drive elements of the movable guide elements and, if appropriate, of the feed devices within the cassette, it is thus also simply possible subsequently to supply film transfer apparatuses which provide an appropriate installation space above the inking unit of the printing unit with all the elements which are needed for intermittent drive with respect to the film in the transfer nip.

In an advantageous further development, provision is made for the frame itself to be built up from two partial cassettes, so that these can be introduced into the film transfer unit from opposite sides. Each partial cassette can then on its own include guide elements and/or drives and/or feeds, if appropriate with their drives. In particular, in this embodiment, provision can advantageously be made for the drives to be fitted to the frame from outside in a permanent manner. They then do not have to be removed when the partial cassettes are introduced into the transfer unit, since the outer parts of the partial cassettes can remain outside the film transfer unit and can accommodate the drives at these points.

In order to introduce the cassettes or partial cassettes, removable transport aids are advantageously provided in at least one area before or after or else before and after the film transfer unit, through the use of which the introduction of the frame or of the partial cassettes into the transfer unit is at least assisted. In this way, through the use of the transport aids, it can be made easier for an operator to supply a film transfer apparatus with intermittent drive elements. In particular, these transport aids can be provided in the manner of rails which rest on downstream or upstream printing units that terminate with the upper side of the ink fountain of the printing unit underneath the film module.

The invention Independently includes a cassette for accommodating guide elements for use in a film transfer apparatus according to the embodiments described. Through the use of this cassette, a film transfer apparatus which has no intermittent drive elements can be converted into a film transfer apparatus which is suitable for intermittent drive, with it being possible to ensure simple access to an ink fountain of a printing unit located underneath through the removal of the cassette.

With the objects of the invention in view, there is also provided a cassette for a film transfer apparatus. The cassette comprises a frame, guide elements disposed in the frame, and positioning elements at least assisting positioning of the cassette within a film transfer unit of a film transfer apparatus according to the invention upon introduction of the cassette into the film transfer unit and movement of the cassette out of the film transfer unit.

In accordance with another feature of the invention, the cassette can, as described, include feed devices and/or drives for the guide elements and/or the feed devices.

In accordance with a further feature of the invention, for the purpose of connection to drives, appropriate coupling elements can be provided on the cassette sides.

In accordance with an added feature of the invention, the cassette can also be constructed as two partial cassettes which are separate from each other and in each case can be transported on their own into the transfer unit. These partial cassettes can then be joined to each other once more within the transfer unit and coupled.

With the objects of the invention in view, there is concomitantly provided a method for operating a film transfer apparatus. The method comprises providing a cassette having guide elements, which are used to drive the transfer film intermittently, the cassette being at least partly transported into an opening of the film transfer unit, the transfer film then being guided from a supply roll through the cassette over the guide elements within this cassette to a transfer nip and, over guide elements disposed downstream within the cassette, onwards to a take-up roll. Provision is then made for a printing material to be moved through the transfer nip and, during the transfer of a transfer layer from the transfer film to the printing material in the area of the transfer nip, for the transfer film itself to be moved at the same speed as the printing material. In order to spare transfer film, at least during the times during which no transfer layer can be transferred, for instance if there is a channel in the transfer cylinder, provision is made for the transfer film to be at least braked during a time interval in which no layer can or is to be transferred. During the transfer of a transfer layer, the guide elements within the cassette are moved in an acceleration direction and, during the braking, in order to avoid excessive wastage of transfer film, are moved in a braking direction.

In this way, transfer film web can successfully be spared, through the use of a cassette which includes guide elements for intermittent drive.

In particular, in a first step, this cassette can be moved out of the opening of the film transfer unit again and access can then at least be made to the ink fountain of a printing unit located underneath, through the installation space which has become free as a result.

Other features which are considered as characteristic for the invention are set forth in the appended claims.

Although the invention is illustrated and described herein as embodied in a film transfer apparatus, a cassette for a film transfer apparatus and a method for operating a film transfer apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
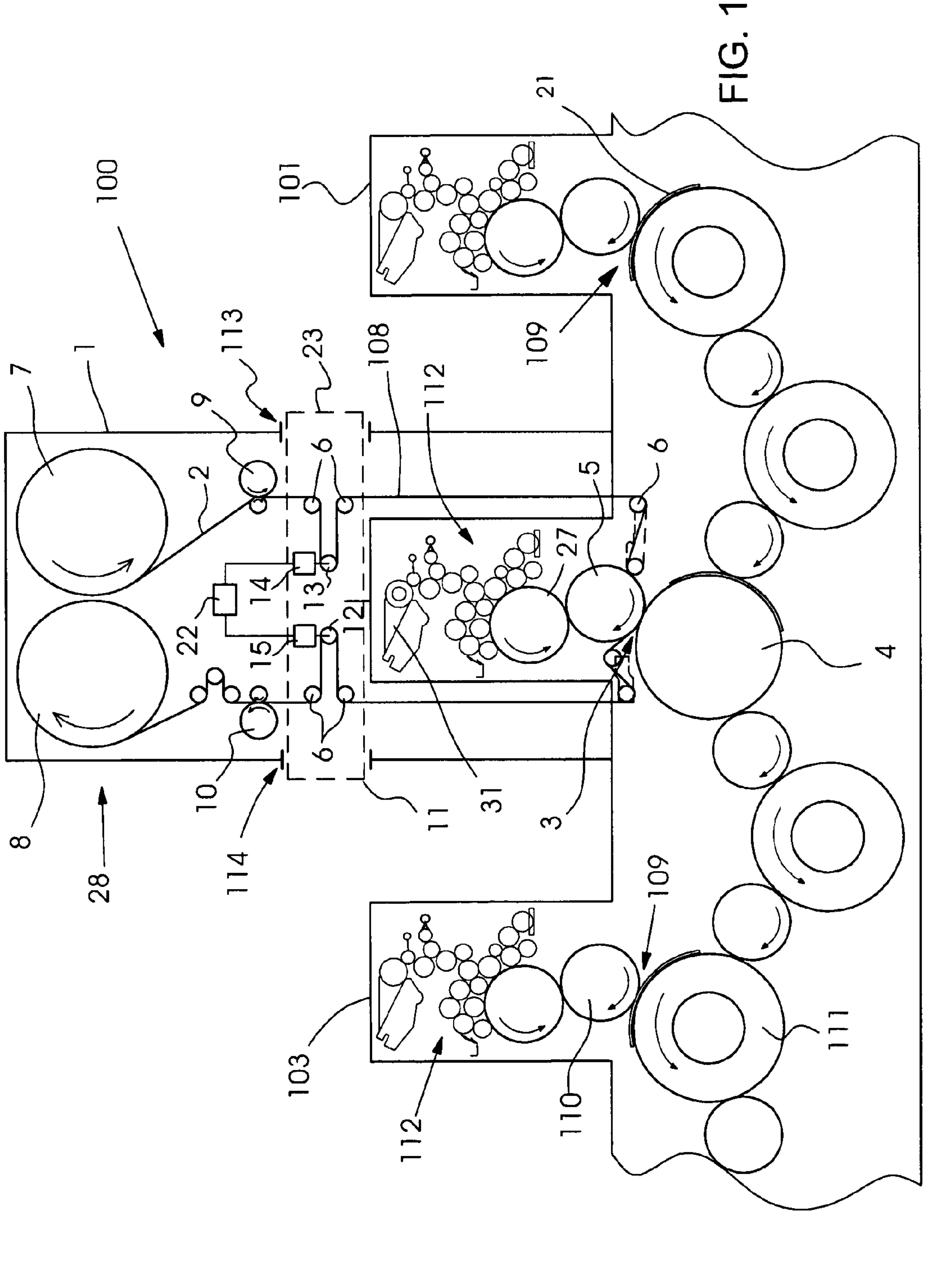
FIG. 1 is a fragmentary, diagrammatic, longitudinal-sectional view of a portion of a printing press having a cold film module.

Referring now to the figures of the drawings in detail and first, particularly, to FIG. 1 thereof, there is seen a portion of a film transfer apparatus 100. The film transfer apparatus 100 substantially includes a conventional printing press having a printing unit converted to a transfer unit 1.

The film transfer unit 1 in this case includes an original press nip, which in this case is now a transfer nip 3 and is formed by a transfer cylinder 5 and an impression cylinder 4. The transfer cylinder 5 can be a conventional blanket cylinder. Like a conventional printing unit, the film transfer unit 1 also includes a plate cylinder 27 and an inking unit 112 with an ink fountain 31, which can be used to ink a printing plate that may possibly be present on the plate cylinder 27.

In order to use the film transfer unit 1, the printing unit has been modified in such a way that a film transfer module 28 has been placed on the printing unit. The film transfer module 28 includes a film supply roll 7, which is composed of at least one web of transfer film 2, and a take-up roll 8. In this case, different partial rolls of transfer film 2, for example with different colorations, can alternatively also be provided. For this purpose, the supply roll 7 is mounted on a friction shaft, which is not illustrated further herein.

In order to pull the transfer film 2 forward off the supply roll 7, a front feed 9 is provided, which pulls the transfer film 2 off the supply roll 9 in the manner of a drive. The film transfer module 28 then also has further guides 6, 12, 13 for the transfer film 2, which guide the transfer film 2 to the transfer nip 3 of the printing unit.

In order to reduce unnecessary consumption of film, that is to say to avoid the transfer of a transfer layer from the transfer film 2 to a printing material 21, individual guide elements 12, 13 are provided as movable guide elements in the form of dancers 12, 13.

Intermittent drive elements of the film transfer unit 1 in this case are provided in the form of an intermittent drive module 11, which includes the dancers 12, 13 and drives 14, 15 connected to the latter. In this case, the module 11 has a frame 23, with which the module 11 can be pushed into openings 113 or 114 of the film transfer unit 1. In this way, the film transfer apparatus 100 can also be supplied with intermittent drive elements if initially only one film transfer module 28 without an intermittent drive was provided. The intermittent drive module 11 can be pushed into the transfer unit 1 and taken out of the latter through the openings 113, 114 provided in the same. An installation space within the film transfer unit 1, which becomes free when the intermittent drive module 11 is pulled out, can then be used for the purpose of supplying the inking unit 112 with ink through the ink fountain 31 during use of the transfer unit 1 as a conventional printing unit.

Once the intermittent drive module 11 has been pushed into the transfer unit 1, then the motors 14, 15 for driving the dancers 12, 13 are connected to a control device 22 for driving the dancers 12, 13 intermittently at the frequency of passage of a sheet 21 through the transfer nip 3.

In order to act on the sheet 21 in the film transfer apparatus 100, the sheet 21 is first transported through a first printing unit, which functions as an applicator 101. This applicator 101 has a press nip 109. Instead of ink, adhesive is partially applied to the printed sheet 21 in the applicator 101 as a function of an exposed printing plate. The printed sheet 21 is guided onward through the film transfer apparatus 100 and guided through the transfer nip 3 on the impression cylinder 4. In the transfer nip 3, the sheet 21 picks up a transfer layer from the transfer film 2 in the areas to which adhesive has been applied. This transfer layer is generally a colored, metallized varnish layer. In a subsequent printing unit 103, the sheet 21 can be imaged through the use of an inking unit 112 in a further press nip 109, which is formed by a blanket cylinder 110 and an impression cylinder 111.

If the film transfer apparatus 100 is then to be used as a conventional printing press, the transfer film 2 can be taken out of the area of the transfer nip 3. It is then also removed from the area of the deflection rollers 6 which are used as guide elements for feeding the transfer film 2 to the transfer nip 3. If, in addition, the module 11 is pulled out of the transfer unit 1, then the inking unit 112 can simply be supplied with ink through the ink fountain 31, which is then free, a printing plate provided on a plate cylinder 27 in the transfer unit 1 can be inked and, in the transfer unit 3, as in a conventional press nip 109, ink can be transferred partially to a printing material. The film transfer unit 1 then serves as a conventional printing unit.

Figure 2:
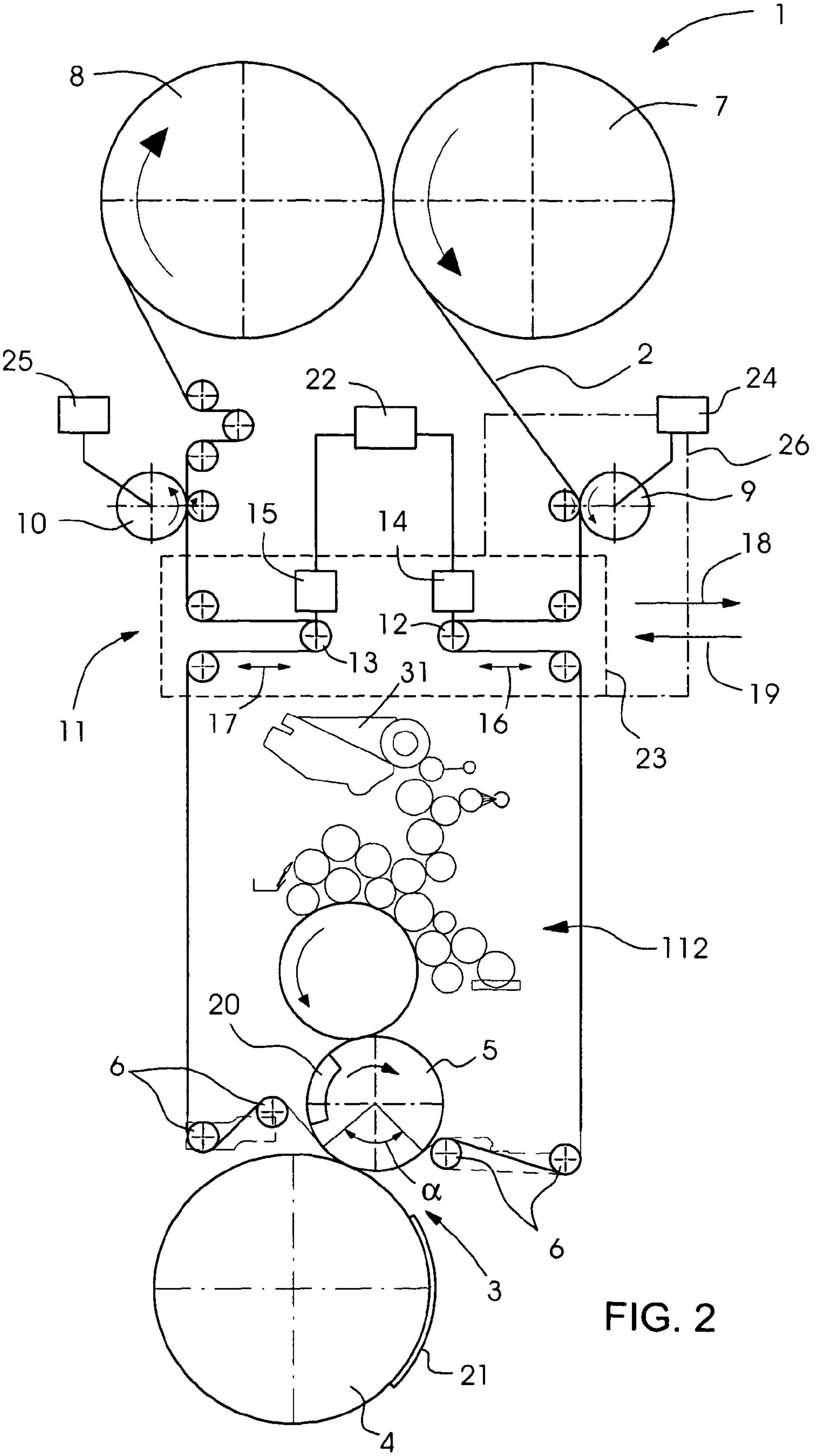
FIG. 2 is an enlarged, longitudinal-sectional view of a film transfer unit with a cassette for intermittent drive elements.

FIG. 2 symbolically shows the film transfer unit 1 according to FIG. 1. The same elements are identified in this case by the same designations.

Within the module 11, the dancers 12, 13 have motors 14, 15 which are able to move the dancers in direction of the double arrows 16, 17. The transfer film 2 is unwound from the supply roll 7 and driven at a first speed through the use of the front feed 9. As a sheet 21 passes through the transfer nip 3, the feed speed plus a speed of the dancer 12 in the direction of an acceleration arrow 18 then results in a resultant total speed of the transfer film 2 within the transfer nip 3 which corresponds to the speed of movement of the printing material 21. Once the printing material 21 has been transported completely through the transfer nip 3, and/or a channel 20 of the transfer cylinder 5 is located in the area of the transfer nip 3, the transfer film 2 is braked and, if necessary, is stopped or pulled back, in that the front and the rear dancers 12, 13 are moved uniformly or slightly asynchronously in relation to each other in the braking direction 19 within the intermittent drive module 11 by the motors 14, 15. This braking can in general be provided when no transfer layer is to be transferred to the sheet 21.

Provision is preferably made for the drives 14, 15 of the intermittent drive module 11 to be configured in such a way that they can be taken off this intermittent drive module 11. They are then located outside the frame 23 and can be taken off in order to insert the cassettes 23 into the film transfer unit 1, and subsequently put in place again. After the intermittent drive module 11 has been inserted and the drives 14, 15 have been connected, the latter are connected to the control unit 22.

An alternative embodiment 26 of the frame of the cassette is predefined through a dash-dotted line. Within this alternative embodiment, the frame 26 can also include the front feed 9. In this case, as described, it is possible for a feed drive 24 of the front feed 9 to be connected to the frame 26 and to the feed 9 through a coupling in such a way that it can be removed. The same can additionally or alternatively be provided on the other side of the film module 28, where a rear feed 10, possibly together with its drive 25, can be included by the frame 26.

Figure 3:
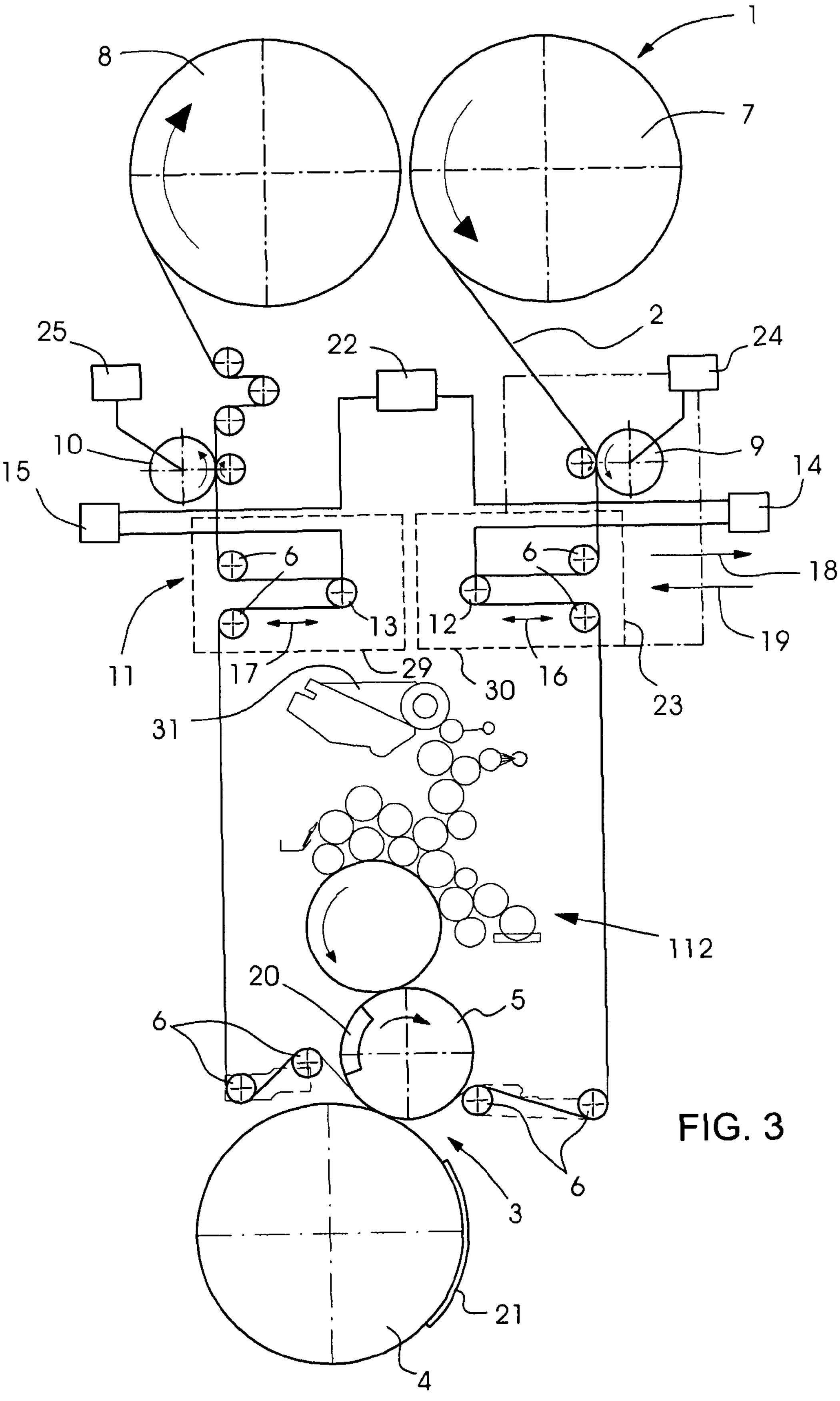
FIG. 3 is a view similar to FIG. 2 of a transfer unit having intermittent drive elements in two partial cassettes.

FIG. 3 shows a further alternative embodiment of the intermittent drive module 11. In this case, the intermittent drive module 11 includes 2 partial frames in the form of partial cassettes 29, 30, which in each case include a dancer 12, 13 and associated deflection rollers 6. In this embodiment, the drives 14, 15 of the dancers 12, 13 can advantageously be permanently connected to the partial cassettes 29, 30 and be located outside the frame of these partial cassettes 29, 30. The partial cassettes 29, 30 can be taken out of the film transfer unit 1 in the opposite direction and are correspondingly inserted into the film transfer unit 1. During the insertion of the partial cassettes 29, 30, the drives 14, 15 of the dancers 12, 13 are again connected to the control device 22. The drives 14, 15 are permanently connected to the partial cassettes 29, 30 outside the latter in such a way that they are also located outside a frame of the film transfer unit 1 and, for example, are provided outside the openings 113, 114 of the film transfer unit 1.

In this way, for example, it is also possible for only one partial cassette 29 to be pulled out in order to permit access to the ink fountain 31 of an inking unit 112.

Even with a film transfer module 28 installed, a film transfer unit 1 according to FIG. 2 or 3 can thus easily also be used as a printing unit with the film transfer module 28 switched off, since in this case simple access to the ink fountain 31 of the inking unit 112 lying underneath is also ensured.

Figure 4:
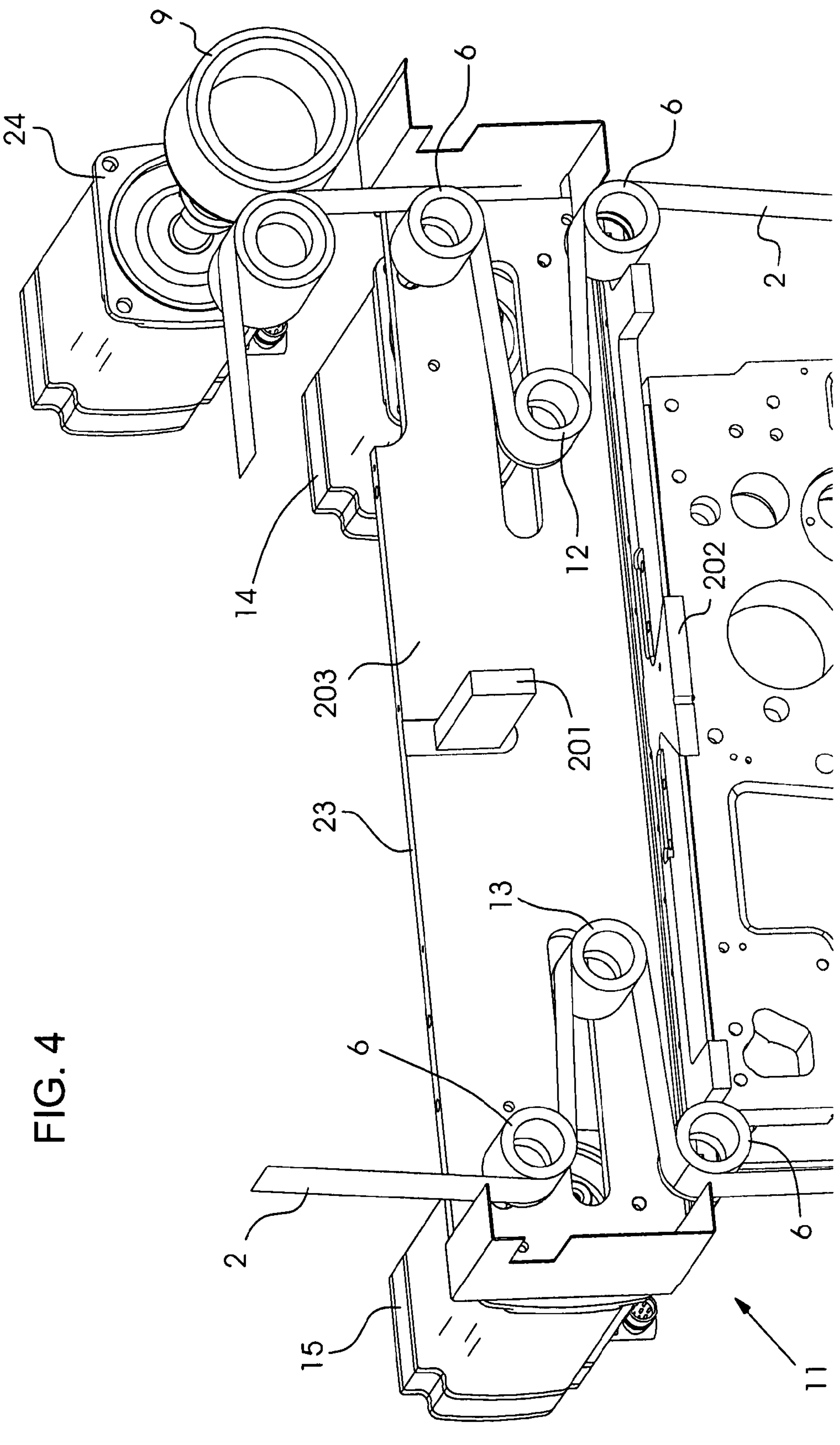
FIG. 4 is a fragmentary, perspective view of an intermittent drive module as a cassette.

An illustration of a cross section of an intermittent drive module 11 is illustrated in FIG. 4. The intermittent drive module 11 is present in the form of a cassette having a frame 23. For improved stability, the frame 23 can also have horizontal struts 201, which connect side edges 203 of the frame 23 to each other in a supportive manner. In this case, only the left-hand side edge 203 is shown symbolically. Furthermore, the intermittent drive module 11 can also have a base 202, which improves the stability still further. The same elements in this drawing are designated by the same designations as in the other figures.

Figure 5:
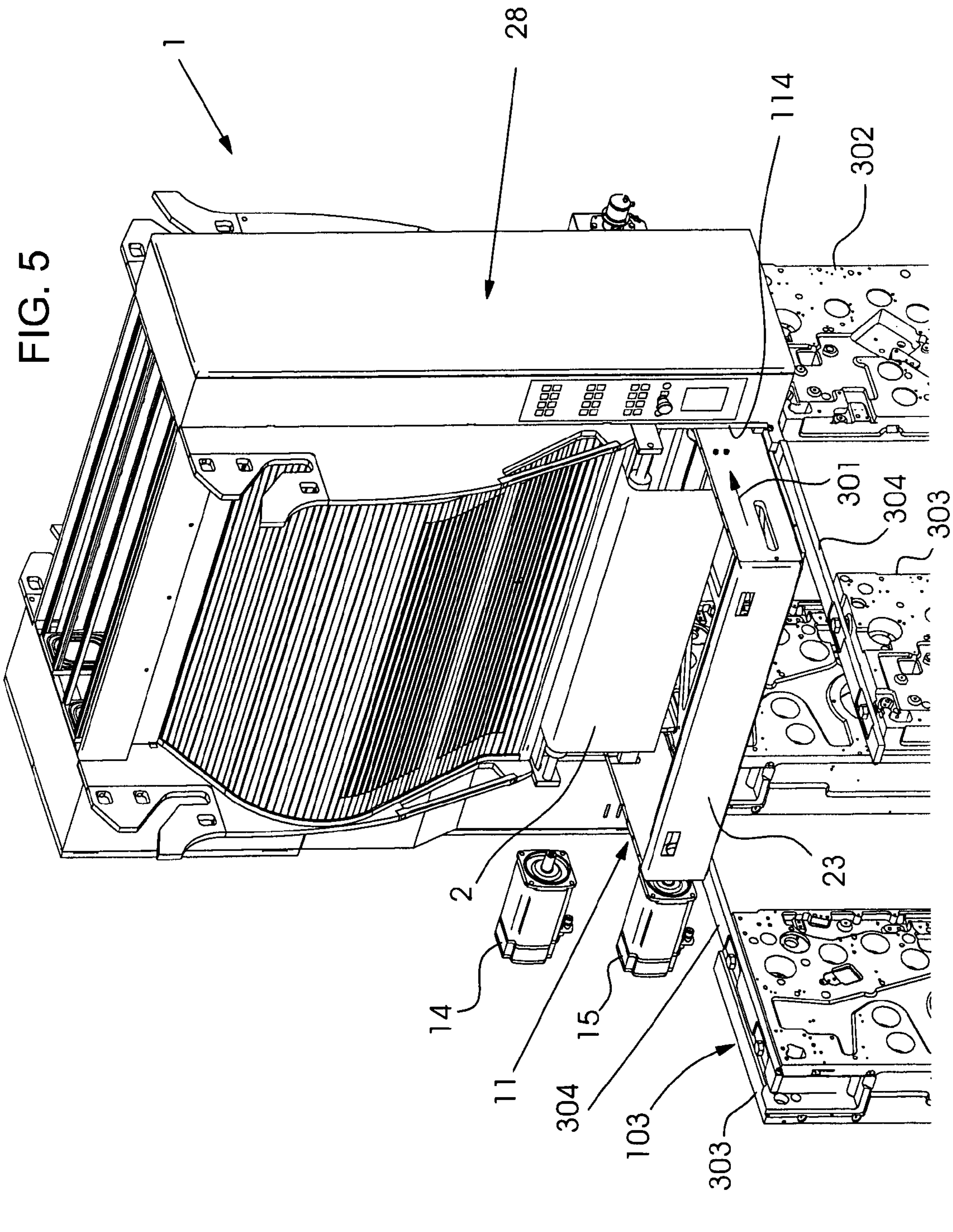
FIG. 5 is a fragmentary, perspective view of a transfer unit with a partly inserted intermittent drive module.

FIG. 5 shows a film transfer unit 1 having at least one front opening 114, into which a cassette in the form of an intermittent drive module 11 having a frame 23 is inserted in the horizontal direction 301. The same designations also designate the same elements in this case.

The film transfer module 28 is placed on the frame 302 of a conventional printing unit. The intermittent drive module 11 is placed with its frame 23 on holding or positioning elements in the form of rails 304, through which it can be pushed into the opening 114 of the film transfer unit 1.

The rails 304 are connected on one side to the film transfer module 28 but can equally well be connected to the frame 302 of the printing unit located underneath. On the other side, the rails 304 are detachably connected to the frame 303 of a printing unit 103 placed downstream of the film transfer unit 1. The rails 304 are fitted only when an intermittent drive module 11 is to be introduced into the film transfer unit 1.

In order to insert the intermittent drive module 11 into the film transfer unit 1, the motor 14 of the front dancer 12 is located separately from the latter. The motor 14 is also separate from the frame 23 of the intermittent drive module 11. It is only when the module 11 has been introduced completely into the transfer unit 1 that the connecting point for the motor 14 on the frame 23 is once more outside the opening 11 of the film transfer module 28 and the motor 14 can once more be fitted to the frame 23.

In this way, an ink fountain 31 within the frame 302 of the inking unit 112 located under the film transfer module 28 can be opened by a user in order, for example, to put in ink, when the module 11 is located outside the film transfer unit 1, by the user making access to the ink fountain 31 through the opening 114.

In order to transport the module 11 into the transfer unit 1, the module 11 can simply be placed on the rails 304 after the motor 14 has been removed. The frame 23 is then pushed into the opening 114. Once the module 11 is located completely within the transfer unit 11, the motor 14 can be fitted again, a transfer film 2 can be guided over the dancers 12, 13 of the intermittent drive module and further guide elements 6, from a supply roll 7 to a take-up roll 8, through the transfer nip 3 and, during a coating operation for printed sheets 21, the transfer film 2 can be driven intermittently at a cycle rate depending on areas of the printed sheet 21 to be coated.

The invention claimed is:

1. A film transfer apparatus for a transfer film having a carrier film and a transfer layer, the film transfer apparatus comprising:

a transfer nip for transferring the transfer layer, at least in some areas, from the carrier film to a printing material;

a film transfer unit having an opening, a supply roll for providing the transfer film and a take-up roll for receiving used transfer film;

a frame;

adjustable guide elements disposed in said frame for adapting a speed of movement of the transfer film, at least from time to time, to a speed of the printing material in the transfer nip; and holding elements disposed in vicinity of said opening for holding said frame;

said frame with said guide elements being constructed as a cassette configured to be introduced into said opening;

at least one drive disposed within said frame for adjusting said guide elements, said at least one drive and said frame configured to be pulled out of and pushed into said film transfer unit.

2. A film transfer apparatus for a transfer film having a carrier film and a transfer layer, the film transfer apparatus comprising:

a transfer nip for transferring the transfer layer, at least in some areas, from the carrier film to a printing material;

a film transfer unit having an opening, a supply roll for providing the transfer film and a take-up roll for receiving used transfer film;

a frame;

adjustable guide elements disposed in said frame for adapting a speed of movement of the transfer film, at least from time to time, to a speed of the printing material in the transfer nip;

holding elements disposed in vicinity of said opening for holding said frame;

said frame with said guide elements being constructed as a cassette configured to be introduced into said opening; and at least one drive disposed outside said frame for adjusting said guide elements, and couplings for connecting said at least one drive to said frame and said guide elements in said frame and detaching said at least one drive from said frame and said guide elements in said frame.

3. The film transfer apparatus according to claim 2, wherein said at least one drive is fixedly disposed outside said frame in vicinity of said film transfer unit for adjusting said guide elements, and couplings for connecting said at least one drive to said frame and to said guide elements in said frame.

4. The film transfer apparatus according to claim 1, which further comprises at least one feed device for driving the transfer film at least one of from said supply roll or to said take-up roll within said frame, said at least one feed device configured to be moved with said frame out of and into said transfer unit as a cassette.

5. The film transfer apparatus according to claim 4, which further comprises at least one feed drive for driving said at least one feed device, said at least one feed drive disposed within said frame and configured to be transported with said frame.

6. The film transfer apparatus according to claim 4, which further comprises at least one feed drive for driving said at least one feed device, said at least one feed drive disposed outside said frame, and couplings for connecting said at least one feed drive to said frame and said at least one feed device in said frame and detaching said at least one feed drive from said frame and said at least one feed device.

7. The film transfer apparatus according to claim 4, which further comprises at least one feed drive for driving said at least one feed device, said at least one feed drive disposed fixedly outside said frame in vicinity of said film transfer unit, and couplings for connecting said at least one feed drive to said frame and said at least one feed device in said frame.

8. A film transfer apparatus for a transfer film having a carrier film and a transfer layer, the film transfer apparatus comprising:

a transfer nip for transferring the transfer layer, at least in some areas, from the carrier film to a printing material;

a film transfer unit having an opening, a supply roll for providing the transfer film and a take-up roll for receiving used transfer film;

a frame;

adjustable guide elements disposed in said frame for adapting a speed of movement of the transfer film, at least from time to time, to a speed of the printing material in the transfer nip; and holding elements disposed in vicinity of said opening for holding said frame;

said frame with said guide elements being constructed as a cassette configured to be introduced into said opening, said frame including two partial cassettes configured for being introduced into said film transfer unit substantially from opposite sides, and each of said partial cassettes including a respective one of said guide elements associated with the transfer film in a region in front of or in a region behind said transfer nip.

9. The film transfer apparatus according to claim 8, which further comprises removable transport aids in at least one region before and/or after said film transfer unit, said aids at least assisting an introduction of said frame or of said partial cassettes into said transfer unit.

10. A method for operating a film transfer apparatus, the method comprising the following steps:

providing a cassette having a frame, at least one guide element disposed in the frame for intermittenly driving guidence of a transfer film, and positioning elements at least assisting positioning of the cassette within a film transfer unit contained in a film transfer apparatus according to claim 1 upon introduction of the cassette out of the film transfer unit;

at least partly transporting the cassette into an opening of the film transfer unit;

guiding the transfer film from a supply roll through the cassette, over the at least one guide element to a transfer nip and over the at least one guide element to a take-up roll;

moving a printing material through the transfer nip, and moving the transfer film at the same speed as the printing material during a transfer of a transfer layer from the transfer film to the printing material in vicinity of the transfer nip; and during a time interval in which no transfer layer is transferred, at least braking the transfer film in vicinity of the transfer nip, and moving the at least one guide element in the cassette in an acceleration direction during the transfer and in a braking direction during the braking.

11. A film transfer apparatus for a transfer film having a carrier film and a transfer layer, the film transfer apparatus comprising:

a transfer nip for transferring the transfer layer, at least in some areas, from the carrier film to a printing material;

a film transfer unit having an opening, a supply roll for providing the transfer film and a take-up roll for receiving used transfer film;

a frame;

adjustable guide elements disposed in said frame for adapting a speed of movement of the transfer film, at least from time to time, to a speed of the printing material in the transfer nip; and holding elements disposed in vicinity of said opening for holding said frame;

said frame with said guide elements being constructed as a cassette configured to be introduced into said opening, said supply roll and said take-up roll not being included in said cassette.

12. The film transfer apparatus according to claim 8, which further comprises at least one feed device for driving the transfer film at least one of from said supply roll or to said take-up roll within said frame, said at least one feed device configured to be moved with said frame out of and into said transfer unit as a cassette.

13. The film transfer apparatus according to claim 12, which further comprises at least one feed drive for driving said at least one feed device, said at least one feed drive disposed within said frame and configured to be transported with said frame.

14. The film transfer apparatus according to claim 12, which further comprises at least one feed drive for driving said at least one feed device, said at least one feed drive disposed outside said frame, and couplings for connecting said at least one feed drive to said frame and said at least one feed device in said frame and detaching said at least one feed drive from said frame and said at least one feed device.

15. The film transfer apparatus according to claim 11, which further comprises at least one feed device for driving the transfer film at least one of from said supply roll or to said take-up roll within said frame, said at least one feed device configured to be moved with said frame out of and into said transfer unit as a cassette.

16. The film transfer apparatus according to claim 15, which further comprises at least one feed drive for driving said at least one feed device, said at least one feed drive disposed within said frame and configured to be transported with said frame.

17. The film transfer apparatus according to claim 15, which further comprises at least one feed drive for driving said at least one feed device, said at least one feed drive disposed outside said frame, and couplings for connecting said at least one feed drive to said frame and said at least one feed device in said frame and detaching said at least one feed drive from said frame and said at least one feed device.

18. The film transfer apparatus according to claim 15, which further comprises at least one feed drive for driving said at least one feed device, said at least one feed drive disposed fixedly outside said frame in vicinity of said film transfer unit, and couplings for connecting said at least one feed drive to said frame and said at least one feed device in said frame.

* * * * *